March 27, 1934.  L V ANDREWS ET AL  1,952,648
REGULATING APPARATUS
Filed May 20, 1932

INVENTORS
L. V. ANDREWS
CHARLES M. TERRY
BY
Albert G. Blodgett
ATTORNEY

Patented Mar. 27, 1934

1,952,648

UNITED STATES PATENT OFFICE 1,952,648

REGULATING APPARATUS

L V Andrews, Worcester, Mass., and Charles M. Terry, Decatur, Ill., assignors to A. W. Cash Company, Decatur, Ill., a corporation of Delaware Application May 20, 1932, Serial No. 612,526

10 Claims. (Cl. 137—139)

This invention relates to regulating apparatus, and more particularly to a mechanism and arrangement thereof whereby a controlled element may be caused to move in a desired and readily adjustable manner relative to another controlled element.

In the automatic control of the combustion of fuel, it is customary to regulate the feed of fuel and the flow of air in accordance with the demand for heat, as indicated for example by the steam pressure in a boiler associated with the combustion furnace. The fuel feed may be regulated perhaps by means of an adjustable rheostat controlling the speed of an electric motor driving a feeding mechanism, while the air flow is ordinarily regulated by means of an adjustable damper located in a duct. It is essential for efficient combustion that the rate of air flow should have a predetermined relationship to the rate of fuel feed throughout the entire operating range.

When such an automatic regulating system is installed, it is a comparatively simple task to adjust the various parts to produce the desired fuel to air ratio at two points in the operating range, say at the maximum and minimum rates at which the furnace is to be operated. If then the furnace is operated at an intermediate rate, it will almost invariably be found that the fuel to air ratio is incorrect. This results from the fact that usually no two controlled elements have the same operating characteristics. For example, a rheostat may be designed to give a so-called straight line control, that is, a given rheostat movement may produce substantially the same change in motor speed at all parts of the operating range. A damper or valve on the contrary will ordinarily give far from a straight line control, since a given movement when the damper is nearly open will have much less effect on the rate of flow than the same movement when the damper is nearly closed. It is a tedious and almost hopeless task to attempt to coordinate the movements of elements having such dissimilar characteristics by cut-and-dry methods such as changes in the lengths of rods and cables, or alterations in the lengths or angularity of arms and levers. It will be found in practically all instances that such changes, in correcting the fuel to air ratio at one part of the operating range, will render this ratio incorrect at other parts of the operating range. A similar problem arises wherever two controlled elements having different operating characteristics are to be regulated to produce a combined result which is a function of the positions of the respective elements.

It is accordingly one object of the invention to provide a simple and inexpensive mechanism whereby two controlled elements may be moved in a predetermined relative manner throughout an operating range.

It is a further object of the invention to provide a simple and inexpensive mechanism whereby the relative positions of two controlled elements at an intermediate point in the operating range may be readily adjusted without affecting their relative positions at two other points in the operating range.

It is a further object of the invention to provide a compact and readily adjustable mechanism which will compensate for the variable operating characteristics of controlled elements used in automatic regulation.

It is a further object of the invention to provide a mechanism which will greatly facilitate the installation of a combustion regulating system, and enable the desired fuel to air ratio to be maintained at all combustion rates.

It is a further object of the invention to provide a mechanism for use in a combustion regulating system which is so arranged that the fuel to air ratio may be easily adjusted at an intermediate combustion rate without affecting the ratio at the maximum and minimum combustion rates.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a side view of a regulating mechanism and associated apparatus, certain parts being shown in section for clearness of illustration;

Figures 1, 2:
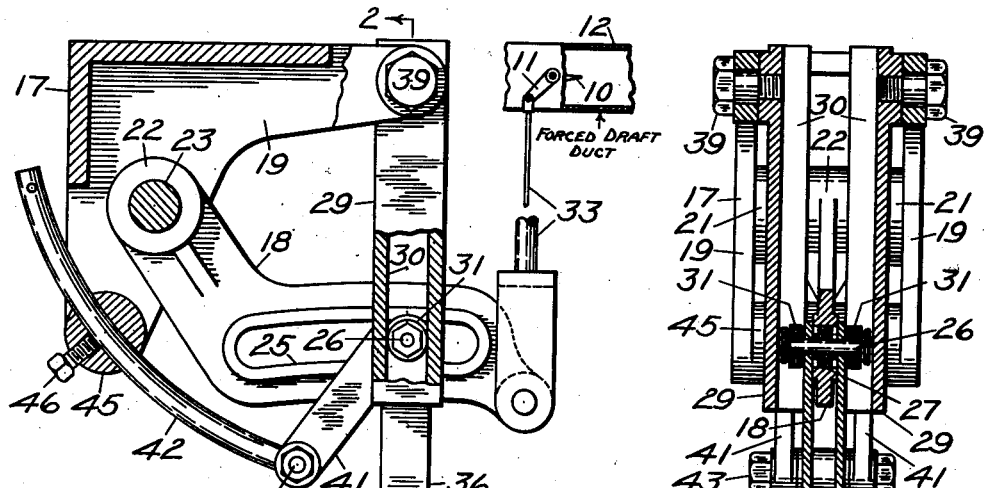
Fig. 2 is a section on the line 2—2 of Fig. 1.
Figure 3:
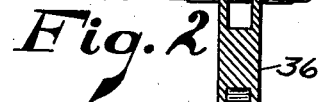
Fig. 3 is a bottom plan view of the construction shown in Fig. 1.

The embodiment illustrated comprises a damper 10 provided with an operating arm 11 and pivotally mounted in a duct 12, which may serve to convey air under forced draft to a combustion furnace (not shown). Fuel, such as pulverized coal, may be delivered to the furnace by a suitable feeder driven by a variable speed electric motor (not shown) under the control of a rheostat 14. The damper 10 and the rheostat 14 are adjusted by means of a suitable automatic regulator 15 which is preferably movable through a definite stroke in accordance with the demand for heat.

It is of course essential for efficient combustion that a correct ratio should be maintained at all times between the rate of fuel supply and the rate of air supply. In actual practice, however, this is a very difficult result to obtain, largely because of the great differences in the operating characteristics of the various controlled elements. For example, adjustment of the rheostat 14 to its mid-position might result in a rate of fuel feed equal to one half the rate obtained at the extreme position of adjustment.
On the other hand, when the damper 10 is at its mid-position the rate of air flow will probably be approximately three-fourths of the flow obtained at the wide open position. Hence if the damper and rheostat are given proportional adjustments throughout the entire operating range, the air flow will be too large in relation to the fuel flow except at the maximum and minimum ratings.

In order to overcome this difficulty, we provide a simple mechanism which serves to modify the movements of the damper with respect to the rheostat. This mechanism comprises a stationary frame 17 to which a lever or arm 18 is pivoted. The frame is preferably formed with a pair of spaced parallel side plates 19 having aligned bosses 21 on their inner faces, and the arm 18 is provided with a hub 22 at one end which fits between the bosses 21. A horizontal shaft 23 extends through the hub 22 and the bosses 21 to support the arm 18 and allow it to swing in a vertical plane.

The arm 18 is provided with a guideway in the form of a slot or opening 25 of uniform width extending therethrough, and a suitable follower 26 is operative in this slot. The follower 26 is shown as a horizontal pin which carries a roller 27 mounted on ball bearings and substantially equal in outside diameter to the width of the slot 25. In order to compel the follower 26 to take a predetermined position in the slot 25 for each position of the arm 18, we provide a member 29 shaped to form a second guideway located in a vertical plane and at an angle to the slot 25. In the preferred construction we utilize two of these guides 29, one at each side of the arm 18, and each having a groove 30 of uniform width extending longitudinally of its inner face. The follower pin 26 carries at each end a roller 31, preferably mounted on ball bearings. These rollers 31 operate in the grooves 30, and their outside diameter is substantially equal to the width of the grooves. With this construction, the position of the follower pin 26 is determined by both the guideways jointly, and its axis will always be located at the intersection of the center lines of the grooves 30 and the slot 25, regardless of the position of the arm 18. The grooves 30 may be curved, but for simplicity of manufacture we prefer to make them straight. If the follower 26 is moved at a uniform speed along the grooves 30, the arm 18 will be given an angular velocity which will be greater when the follower is near the pivotal axis 23 than when it is remote therefrom.
We make use of this change in velocity ratio to vary the movements of the damper 10 with respect to the automatic regulator 15. While either the follower 26 or the arm 18 can be the driven member, we prefer to actuate the follower in accordance with the regulator movements, and to actuate the damper in accordance with the movements of the arm.

In the drawing we have shown for purposes of illustration the simplest connections which we could devise, but it will be understood that in any actual installation additional connecting shafts, rods, etc. would ordinarily be required. As shown in Fig. 1, the movements of the arm 18 are transmitted to the damper 10 by means of a vertical rod 33 which is pivoted at its lower end to the outer end of the arm 18 and at its upper end to the damper operating arm 11. A second vertical rod 34 is arranged to transmit the movements of the regulator 15 to the follower 26. The lower end of this rod 34 is pivoted by means of a pin 35 to the vertically movable member of the regulator, and the upper end of the rod is connected to the follower pin 26, preferably by means of a U-shaped member 36 which straddles the arm 18. The arm 37 of the rheostat is actuated directly by the pin 35.

With the construction as so far described, the damper may be given a velocity which gradually decreases as it approaches closed position, as compared with a substantially uniform velocity for the rheostat, thus tending to compensate for the peculiar characteristics of the damper. Different dampers, however, have different characteristics, and it is therefore important that the mechanism be adjustable to provide more or less compensation. It is furthermore important that there should be two points in the operating range at which adjustment of the mechanism will not affect the damper position. These two points are preferably the maximum and minimum combustion rates desired, at which the regulator will assume respectively its lowest and highest positions.

Figure 4:
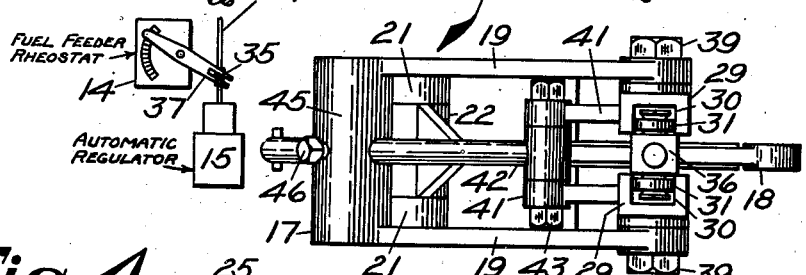
Fig. 4 is a view similar to Fig. 1, but showing the parts in different positions.

In order to obtain this desired adjustment, we provide means whereby the angular position of the guides 29 may be varied. In the preferred construction, each guide is pivoted at its upper end to one of the frame side plates 19 by means of a horizontal screw 39. These screws 39 are axially aligned and located at the center lines of the grooves 30. The screws extend through the side plates 19 into the guides 29, which are mounted on the inner faces of the side plates. With this arrangement, the arm 18 may swing upwardly to a position between the screws 39 without interference. The lower end of each guide is provided with a projecting arm 41, and a rod 42 is fastened at one end to both of these arms 41 by means of a bolt 43. The rod 42 is curved in the arc of a circle about the screws 39 as a center, and extends through an opening in a cross piece 45 which connects the frame side plates 19. A set screw 46 is provided in the cross piece to clamp the rod in a desired position of adjustment. In Fig. 4 the guides 29 are shown in one extreme position, to give the maximum compensating effect. An intermediate position is shown in Fig. 1.

The various parts are preferably so constructed and arranged that at maximum and minimum ratings adjustment of the guides will not move the damper 10. This result is obtained for the maximum rating by forming the slot 25 in the arc of a circle about the pin 35 as a center when the regulator is in its lowermost position as shown in Fig. 1. If the guides are adjusted about the screws 39 under these conditions, the rod 34 will merely swing about the pin 35, and the roller 27 will travel along the slot 25 without moving the arm 18. It should be noted that because of the shortening of rod 34 in Fig. 1, to save space in the drawing, the pin 35 does not appear at the center of the arc 25, but in the actual mechanism it will be at the center. The parts are so proportioned with respect to the stroke of the regulator that at the minimum combustion rate, as indicated by the uppermost regulator position, the follower pin 26 will be aligned with the screws 39. The parts are shown in this position in Fig. 4, and it will be apparent that adjustment of the guides 39 will move neither the follower 26 nor the arm 18, since at all positions of the guides the center lines of the grooves 30 will intersect the axis of the follower pin.

Figure 5:
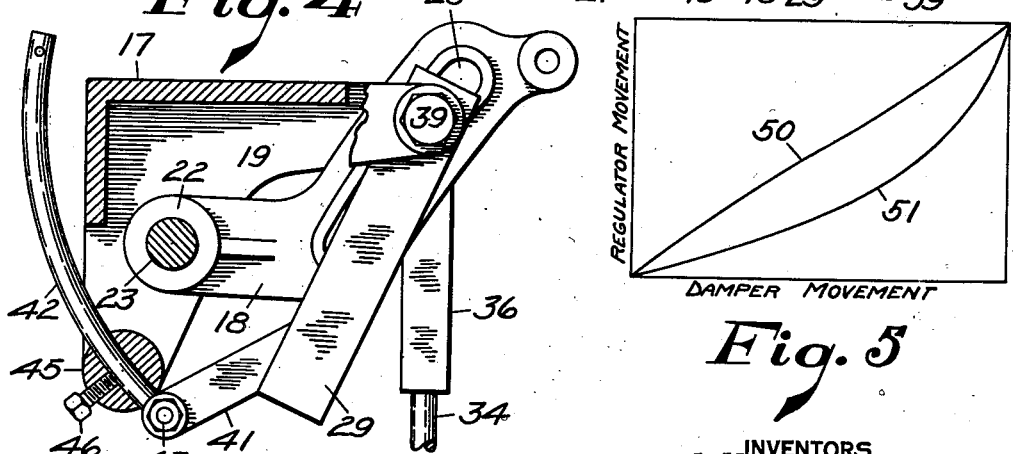
Fig. 5 is a chart showing graphically the effect which may be produced by means of the invention.

In Fig. 5 we have plotted two curves showing the movements of the damper with respect to the regulator for the two extreme adjustment positions of the guides 39. Curve 50 is obtained when the guides are adjusted as far as possible to the right, and is nearly a straight line. Curve 51 is obtained when the guides are adjusted as far as possible to the left, as shown in Fig. 4, and indicates that with this adjustment a given regulator movement will produce a much greater damper movement when the damper is near its open position than when it is near its closed position. It will be noted that the two curves intersect at both the maximum and minimum points.

In installing and adjusting a regulating system of this type, the correct positions of the damper 10 and rheostat 14 to produce the desired fuel to air ratio at minimum and maximum combustion rates should first be determined. This will usually involve a measurement of the percentage of carbon dioxide in the flue gases, a procedure with which all combustion engineers are familiar. The connections between the regulator 15 and the rheostat 14, and the connections between the arm 18 and the damper 10, are then arranged to produce these damper and rheostat positions when the regulator is at the top and bottom of its stroke. This will require a selection of the proper lengths for the various operating arms and connecting rods. While this is being done, it is immaterial what position the guides 29 are in, since adjustment of the guides has no effect on the position of the damper at maximum and minimum ratings. The furnace should next be operated at a steady load about half way between the maximum and minimum points, so that the regulator will assume and maintain an intermediate position. It should then be determined, by inspection of the combustion flame, or preferably by a carbon dioxide measurement, whether too much or too little air is being supplied for the amount of fuel being burned. By simply adjusting the guides 29, the damper 10 can then be moved to a position which will produce the correct air flow. In this way it is possible to provide the correct fuel to air ratio at three widely spaced points in the operating range, and any deviations from the desired ratio at other points will be so slight as to be negligible.

It will now be seen that we have provided a simple and easily adjustable mechanism which will compensate for the variable operating characteristics of controlled elements, such as valves, dampers, etc. Furthermore, adjustment of the mechanism will not affect the positions of the element at two widely spaced points which have previously been determined as the correct positions to produce the desired results. This is brought about by the fact that at one position of the regulator the slot 25 is concentric with the pin 35, and at another position of the regulator the follower 26 is coaxial with the screws 39. These positions preferably, but not necessarily, correspond to the limits of the regulator stroke. As the follower 26 is moved by the regulator in response to changes in the demand for heat, the rollers 31 will travel along the grooves 30, and the roller 27 will travel along the slot 25. At the same time the arm 18 will swing about its supporting shaft 23 and act through the rod 33 and arm 11 to move the damper 10. Friction and wear is rendered negligible by the use of ball bearings in connection with the rollers. The entire mechanism is of rugged construction, and there is nothing which is liable to give trouble in operation.

Having thus described our invention, what we claim as new and desire to secure by Letters Patent is:

1. Regulating apparatus comprising a movable element, an automatic regulator movable through a definite stroke, a mechanical connection between the regulator and the movable element, and means whereby said mechanical connection may be adjusted to vary the position of the movable element relative to the automatic regulator at one part of the regulattor stroke without affecting the position of the movable element at two other points in the regulator stroke.

2. Regulating apparatus comprising a movable element, an automatic regulator movable through a definite stroke, a mechanical connection between the regulator and the movable element, and means whereby said mechanical connection may be adjusted to vary the position of the movable element relative to the automatic regulator at an intermediate part of the regulator stroke without affecting the position of the movable element at the ends of the regulator stroke.

3. Regulating apparatus comprising a flow controlling element movable between an open and a closed position, an automatic regulator movable through a definite stroke, a mechanical connection between the regulator and the element which is so arranged that a given regulator movement will cause a greater movement of the element when the latter is near its open position than when it is near its closed position, and means to adjust the mechanical connection to vary the movements of the element relative to the regulator without varying the total movement of the element.

4. Regulating apparatus comprising a frame, an arm pivotally mounted on the frame and provided with a slot of uniform width, a guide pivotally mounted on the frame at each side of the arm, each guide having a groove therein of uniform width, a follower pin extending through the slot, a roller mounted on the central portion of the pin and positioned within the slot, said roller having a diameter substantially equal to the width of the slot, rollers mounted upon the ends of the pin and positioned within the grooves, the last mentioned rollers having a diameter substantially equal to the width of the grooves, and means to adjust the guides about their pivots.

5. Regulating apparatus comprising a frame, an arm pivotally mounted thereon and shaped to provide a guideway, a follower associated with the guideway, a movable member, a device connecting the member and the follower, said device having a pivotal connection with the member, and the guideway on the arm being shaped in the arc of a circle with its center coinciding with said pivotal connection when the arm and member are each in one position, a guide mounted on the frame and shaped to provide a guideway which operates jointly with the arm guideway to determine the position of the follower, and means to adjust the guide pivotally about an axis on said frame, said parts being so arranged that when the arm and member are in another position the follower will be aligned with said axis, whereby adjustment of the guide will not affect the position of the arm when the member is located at either of two predetermined positions.

6. Regulating apparatus comprising a frame, an arm pivotally mounted thereon and shaped to provide a guideway, a follower associated with the guideway, a member movable through a definite path, a rod connecting the member and the follower, said rod having a pivotal connection with the member, and the guideway on the arm being shaped in the arc of a circle with its center coinciding with said pivotal connection when the arm and member are each in one extreme position, a guide mounted on the frame and shaped to provide a guideway which operates jointly with the arm guideway to determine the position of the follower, and means to adjust the guide pivotally about an axis on said frame, said parts being so arranged that when the arm and member are in the other extreme position the follower will be aligned with said axis, whereby adjustment of the guide will not affect the position of the arm when the member is located at either extreme position.

7. Regulating apparatus comprising a frame, an arm pivotally mounted thereon and having a slot, a follower pin extending through the slot, a roller mounted on the pin and contacting with the walls of the slot, a member movable between two positions, a rod connecting the member and the pin, said rod having a pivotal connection with the member, and the slot in the arm being shaped in the arc of a circle with its center coinciding with said pivotal connection when the arm and member are each in one position, a guide pivotally mounted on the frame at each side of the arm, each guide having a groove therein, rollers on the ends of the pin and contacting with the walls of the grooves, and means to adjust the guides about their pivots, said parts being so arranged that when the arm and member are in the other position the follower pin will be aligned with the guide pivots, whereby adjustment of the guides will not affect the position of the arm when the member is located at either of the two positions.

8. Regulating apparatus comprising a frame, an arm pivotally mounted thereon and shaped to provide a guideway, a member at one side of the arm and shaped to provide a second guideway, said member being pivotally adjustable about an axis on the frame, a follower operatively associated with the guideways, a movable element, an automatic regulator arranged to move the element through a definite stroke, a rod connecting the element and the follower, said rod having a pivotal connection with the element, a movable flow controlling device, and connections between the arm and the flow controlling device, the guideway in the arm being shaped as a circular arc, and the parts being so arranged that when the flow controlling device is near open position the center of the arc will coincide with the pivotal connection, and when the flow controlling device is near closed position the follower will be aligned with the pivotal axis of the member, whereby adjustment of the member will not affect the position of the flow controlling device when the automatic regulator is at either of two positions.

9. Regulating apparatus comprising a frame, an arm pivotally mounted thereon and shaped to provide a guideway, a member pivotally connected to the frame and shaped to provide a second guideway, means to hold the member stationary in a desired position of adjustment about its pivot, and a follower associated with the guideways and so arranged that its position is determined by both said guideways jointly.

10. Regulating apparatus comprising a frame, an arm pivotally mounted thereon and shaped to provide a guideway, a member pivotally connected to the frame and shaped to provide a second guideway which intersects the axis of its pivot, means to hold the member stationary in a desired position of adjustment about its pivot, and a follower associated with the guideways and so arranged that its position is determined by both said guideways jointly, the arm being movable to a position which will bring the follower in line with the pivot for the member, so that when the parts are in this position the follower will remain stationary as the member is adjusted about its pivot.

L V ANDREWS.
CHARLES M. TERRY.